US010570728B2

(12) United States Patent
Roberson et al.

(10) Patent No.: US 10,570,728 B2
(45) Date of Patent: Feb. 25, 2020

(54) DOWNHOLE FLUID CHARACTERIZATION METHODS AND SYSTEMS USING MULTI-ELECTRODE CONFIGURATIONS

(71) Applicant: Halliburton Energy Services, Inc., Houston, TX (US)

(72) Inventors: Mark Roberson, Cary, NC (US); Charles Bartee, Durham, NC (US); Scott Goodwin, Chapel Hill, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/216,059

(22) Filed: Dec. 11, 2018

(65) Prior Publication Data

US 2019/0136689 A1    May 9, 2019

Related U.S. Application Data

(62) Division of application No. 15/501,354, filed as application No. PCT/US2015/060390 on Nov. 12, 2015, now Pat. No. 10,190,411.

(51) Int. Cl.
*E21B 47/16* (2006.01)
*E21B 47/00* (2012.01)
(Continued)

(52) U.S. Cl.
CPC .......... *E21B 47/16* (2013.01); *E21B 47/0005* (2013.01); *E21B 47/01* (2013.01);
(Continued)

(58) Field of Classification Search
CPC ... G01V 3/28; G01V 3/30; G01V 3/26; G01V 3/20
(Continued)

(56) References Cited

U.S. PATENT DOCUMENTS

| 4,570,123 A | 2/1986 | Grosso |
| 4,594,552 A | 6/1986 | Grimaldi et al. |

(Continued)

FOREIGN PATENT DOCUMENTS

| EP | 0964134 A2 | 12/1999 |
| WO | 2016032677 A1 | 3/2016 |

(Continued)

OTHER PUBLICATIONS

International Search Report and Written Opinion issued in related PCT Application No. PCT/US2015/060390 dated Aug. 10, 2016, 12 pages.

(Continued)

*Primary Examiner* — Patrick Assouad
*Assistant Examiner* — Demetrius R Pretlow
(74) *Attorney, Agent, or Firm* — Thomas Rooney; Baker Botts L.L.P.

(57) ABSTRACT

Systems and methods using multi-electrode configurations for characterizing fluids in subterranean formations during various treatment operations are provided. In certain embodiments, the methods comprise: placing a tubular base structure having a multi-electrode configuration disposed thereon in at least a portion of a well bore penetrating at least a portion of a subterranean formation, the multi-electrode configuration comprising at least first and second electrodes with a dielectric layer between the tubular base structure and the electrodes; collecting electromagnetic measurements using the multi-electrode configuration; and processing the electromagnetic measurements to obtain a characterization of at least one fluid in an annulus between the tubular base structure and an inner wall of the well bore. The first and second electrodes of the multi-electrode configuration may be oriented along non-parallel planes and/or positioned at (Continued)

different heights from an outer surface of the tubular base structure.

9 Claims, 4 Drawing Sheets

(51) Int. Cl.
  *E21B 47/09* (2012.01)
  *G01V 3/26* (2006.01)
  *E21B 47/01* (2012.01)
  *G01V 3/20* (2006.01)
(52) U.S. Cl.
  CPC ............ *E21B 47/0905* (2013.01); *G01V 3/20* (2013.01); *G01V 3/26* (2013.01)
(58) Field of Classification Search
  USPC .................................................. 324/346–375
  See application file for complete search history.

(56) References Cited

U.S. PATENT DOCUMENTS

| | | | | |
|---|---|---|---|---|
| 6,060,886 | A * | 5/2000 | Tabarovsky | G01V 3/24 324/373 |
| 6,160,492 | A | 12/2000 | Herman | |
| 6,476,609 | B1 * | 11/2002 | Bittar | G01V 3/30 324/338 |
| 7,234,519 | B2 | 6/2007 | Fripp et al. | |
| 2003/0229450 | A1 * | 12/2003 | Strickland | G01V 3/28 702/10 |
| 2005/0099184 | A1 * | 5/2005 | Gianzero | E21B 49/00 324/342 |
| 2005/0205248 | A1 | 9/2005 | Barolak et al. | |
| 2007/0068673 | A1 | 3/2007 | Daily | |
| 2009/0015261 | A1 * | 1/2009 | Yang | G01V 3/28 324/343 |
| 2010/0126718 | A1 | 5/2010 | Lilley | |
| 2010/0156424 | A1 * | 6/2010 | Bittar | G01V 3/28 324/339 |
| 2010/0225323 | A1 * | 9/2010 | Tabarovsky | G01V 3/28 324/341 |
| 2010/0283469 | A1 * | 11/2010 | Wang | G01V 3/30 324/338 |
| 2010/0283470 | A1 * | 11/2010 | Streinz | G01V 3/30 324/338 |
| 2011/0221443 | A1 * | 9/2011 | Bittar | G01V 3/30 324/339 |
| 2012/0069705 | A1 | 3/2012 | Zhao | |
| 2012/0182831 | A1 * | 7/2012 | Cooper | E21B 47/101 367/25 |
| 2014/0062489 | A1 | 3/2014 | Pindiprolu et al. | |
| 2014/0111349 | A1 | 3/2014 | Roberson et al. | |
| 2014/0167767 | A1 | 6/2014 | Herrera et al. | |
| 2014/0182845 | A1 | 7/2014 | Roberson et al. | |
| 2014/0262321 | A1 | 9/2014 | Fripp et al. | |
| 2014/0298900 | A1 * | 10/2014 | Clarke | E21B 49/00 73/152.55 |
| 2014/0324353 | A1 | 10/2014 | Hou et al. | |
| 2014/0367092 | A1 * | 12/2014 | Roberson | E21B 47/00 166/250.01 |
| 2015/0153474 | A1 | 6/2015 | Donderici et al. | |
| 2015/0346017 | A1 | 12/2015 | LePort et al. | |
| 2016/0216396 | A1 * | 7/2016 | Golla | E21B 47/0905 |
| 2017/0058608 | A1 * | 3/2017 | Fraser | E21B 7/15 |
| 2018/0266239 | A1 * | 9/2018 | Jarrot | E21B 47/024 |

FOREIGN PATENT DOCUMENTS

| | | |
|---|---|---|
| WO | 2016/130138 A1 | 8/2016 |
| WO | 20171145 A1 | 7/2017 |

OTHER PUBLICATIONS

International Preliminary Report on Patentability issued in related PCT application No. PCT/US2015/060390, dated May 24, 2018, 8 pages.

Official Action and Search Report issued in related Norwegian Application No. 20180448, dated May 24, 2018, 6 pages.

\* cited by examiner

DOWNHOLE FLUID CHARACTERIZATION METHODS AND SYSTEMS USING MULTI-ELECTRODE CONFIGURATIONS

CROSS-REFERENCE TO RELATED APPLICATIONS

The present application is a divisional of U.S. application Ser. No. 15/501,354, filed Feb. 2, 2017, entitled "Downhole Fluid Characterization Methods and Systems Using Multi-Electrode Configurations" which is a U.S. National Stage Application of International Application No. PCT/US2015/060390 filed Nov. 12, 2015, all of which are incorporated herein by reference in their entirety for all purposes.

BACKGROUND

The present disclosure relates to systems and methods for characterizing fluids in subterranean formations during various treatment operations therein.

Hydraulic cement compositions are commonly utilized in subterranean operations, particularly subterranean well completion operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. Often one or more other fluids (e.g., drilling muds, spacer fluids, etc.) may be present in the well bore, but the cement composition and/or other fluids or equipment used in the cementing operation may be introduced into the well bore to displace those fluids so that the cement composition may fill the annular space. Once in place, the cement composition is permitted to set in the annular space, thereby forming an annular sheath of hardened substantially impermeable cement therein that substantially supports and positions the pipe string in the well bore and seals the exterior surfaces of the pipe string and the walls of the well bore. Such pipe strings within a well bore in a subterranean formation are often used, among other purposes, to ensure that the borehole does not collapse once it is drilled and that sensitive areas of the formation are protected and isolated. Thus, cement placement and the strength of both cement bonds (i.e., with the casing and with the walls of the well bore) are important to the integrity of the well. The presence of small amounts (e.g., layers or pockets) of other fluids between the cement and the casing or well bore walls can form voids in the cement or otherwise compromise the strength of the cement bond with those surfaces.

Various techniques and tools have been used in the art to evaluate the bond between casing strings and the cement placed in the wellbore annulus. In some cases, cement evaluation logs or cement bond logs may be generated by using acoustic sonic or ultrasonic tools to apply acoustic pulses to the casing to make it resonate in its thickness mode, and measuring the energy level (attenuation) of the decaying reflected wave. Good cement bonds to casing typically produces a rapid damping (higher impedance) of the resonance, while poor cement bonds typically result in longer resonance decay (lower impedance). However, these impedance measurements are only an indirect "proxy" for the bond of the cement, and do not directly detect the presence of fluids or spaces between the cement and the casing string or well bore. The use of these acoustic tools also requires additional interventions into a well, which may be costly and/or delay further operations at the well.

BRIEF DESCRIPTION OF THE DRAWINGS

These drawings illustrate certain aspects of some of the embodiments of the present disclosure, and should not be used to limit or define the claims.

Figure 1:
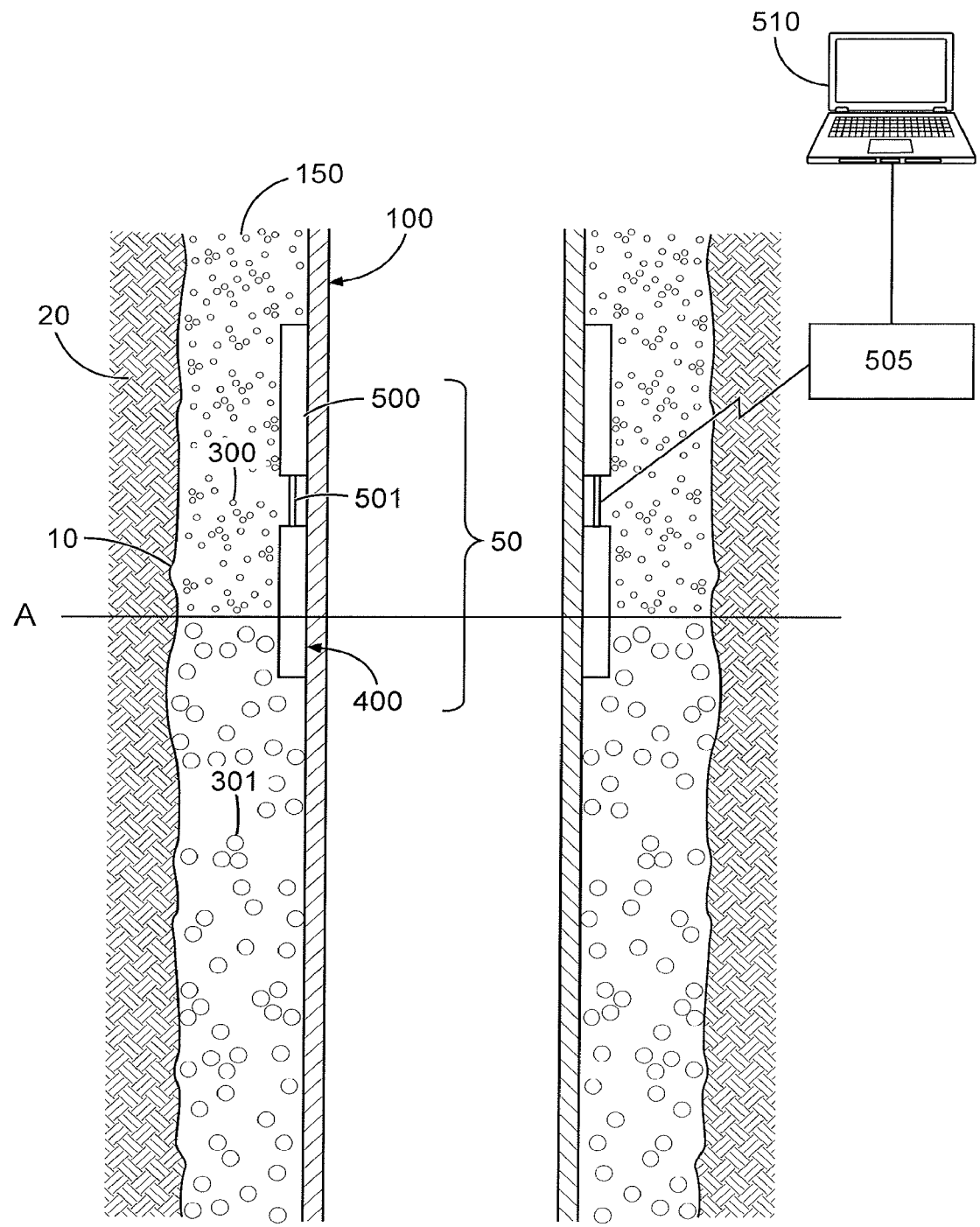
FIG. 1 is a diagram illustrating a side view of a portion of a well bore where an example of a fluid characterization system according to certain embodiments of the present disclosure is installed.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for characterizing fluids in subterranean formations during various treatment operations therein.

More particularly, the present disclosure relates to systems and methods using multi-electrode configurations for characterizing fluids (e.g., fluid layers) in subterranean well bores. As used herein, the term "fluid layer" or "layer" does not imply or require a fluid or region of any particular shape, length, thickness, and/or continuity. Consistent with the present disclosure, a fluid layer may comprise a single contiguous region or shape, or may comprise one or more discontinuous "pockets" of fluid. Moreover, the term "characterization" and derivatives thereof may refer to one or more of number of different steps with regard to a fluid, which may include determining the presence, location, volume, composition, density, and/or any other properties of a fluid, but does not necessarily require any particular one or combination of those steps.

Using a multi-electrode configuration, electromagnetic (EM) signals may be emitted and/or corresponding signals are measured, where variations in the measured EM signals relative to the emitted EM signals are due to the EM properties (e.g., dielectric constant, magnetic permeability, and conductivity) of the downhole fluids or solids that interact with the emitted EM signals. Accordingly, the measured EM signals can be interpreted to identify characteristics of downhole fluids/solids and/or to identify a particular fluid/solid with known characteristics. As an example, the methods and systems of the present disclosure can be used to identify when one or more particular fluids (e.g., oil-based mud, water-based mud, cement slurry, or spacer fluids) are in the annular space near the multi-electrode configuration. The distance to the borehole wall and/or formation EM properties may additionally or alternatively be identified. EM measurements collected using a casing with a multi-electrode configuration as described herein may correspond to different depths of investigation or multiple depths of investigation by varying the frequency of the emitted EM signals and/or by using a plurality of multi-electrode configurations, where each multi-electrode configuration has a different inter-electrode spacing. As desired, EM measurements collected using a casing with one or more multi-electrode configurations as described herein may be collected over time to generate corresponding logs as a function of time. In at least some embodiments, an example method includes placing a tubular base structure has a multi-electrode configuration disposed thereon in at least a portion of a well bore penetrating at least a portion of a subterranean formation. The method also includes collecting EM measurements using the multi-electrode configuration and processing the EM measurements to obtain a characterization of fluids in an annulus between the tubular base structure and an inner wall of the well bore.

Generally, the systems of the present disclosure comprise a tubular base structure (e.g., a pipe string, casing string, or mandrel) that may be placed in at least a portion of a well bore, where the tubular base structure has a multi-electrode configuration disposed thereon, which comprises a plurality of metal electrodes and a dielectric layer between the tubular base structure and the electrodes. In certain embodiments of the present disclosure, at least one of the electrodes is positioned at a first height from an outer surface of the tubular base structure and at least another of the electrodes is positioned at a second height from an outer surface of the tubular base structure, wherein the first height is different from (i.e., greater than or less than) the second height. In certain embodiments of the present disclosure, at least one of the electrodes is oriented at an angle relative to at least another of the electrodes, i.e., the electrodes are oriented along at least two non-parallel planes. As described below, the positioning and/or orientation of the various electrodes in this manner may enhance the effectiveness of the systems of the present disclosure in detecting fluids in a well bore. In certain embodiments, the systems of the present disclosure also includes a controller electrically coupled to the electrodes for directing collection of EM measurements using the multi-electrode configuration, and a processor that processes the EM measurements to obtain a characterization of fluids in an annulus between the casing and the borehole wall. Various multi-electrode configuration options, mounting options, EM measurement collection options, and EM measurement processing options are possible and are contemplated in this disclosure, certain examples of which are described herein.

Among the many potential advantages to the methods and systems of the present disclosure, only some of which are alluded to herein, the methods, compositions, and systems of the present disclosure may facilitate direct detection and/or characterization of fluid layers in a well bore. In certain embodiments, this may, among other benefits, enable more accurate calculations of fluid displacement and/or detect fluids in the annulus of a well bore that could compromise the strength of a cement sheath therein. These benefits may allow operators to make changes or modifications to their cementing operations in progress to address any problems that these annular fluids may cause without the need for subsequent remedial measures. In certain embodiments, the systems of the present disclosure may be incorporated into or installed on equipment already used in the well bore (e.g., casing strings), and thus may not require additional intervention.

Figure 2:
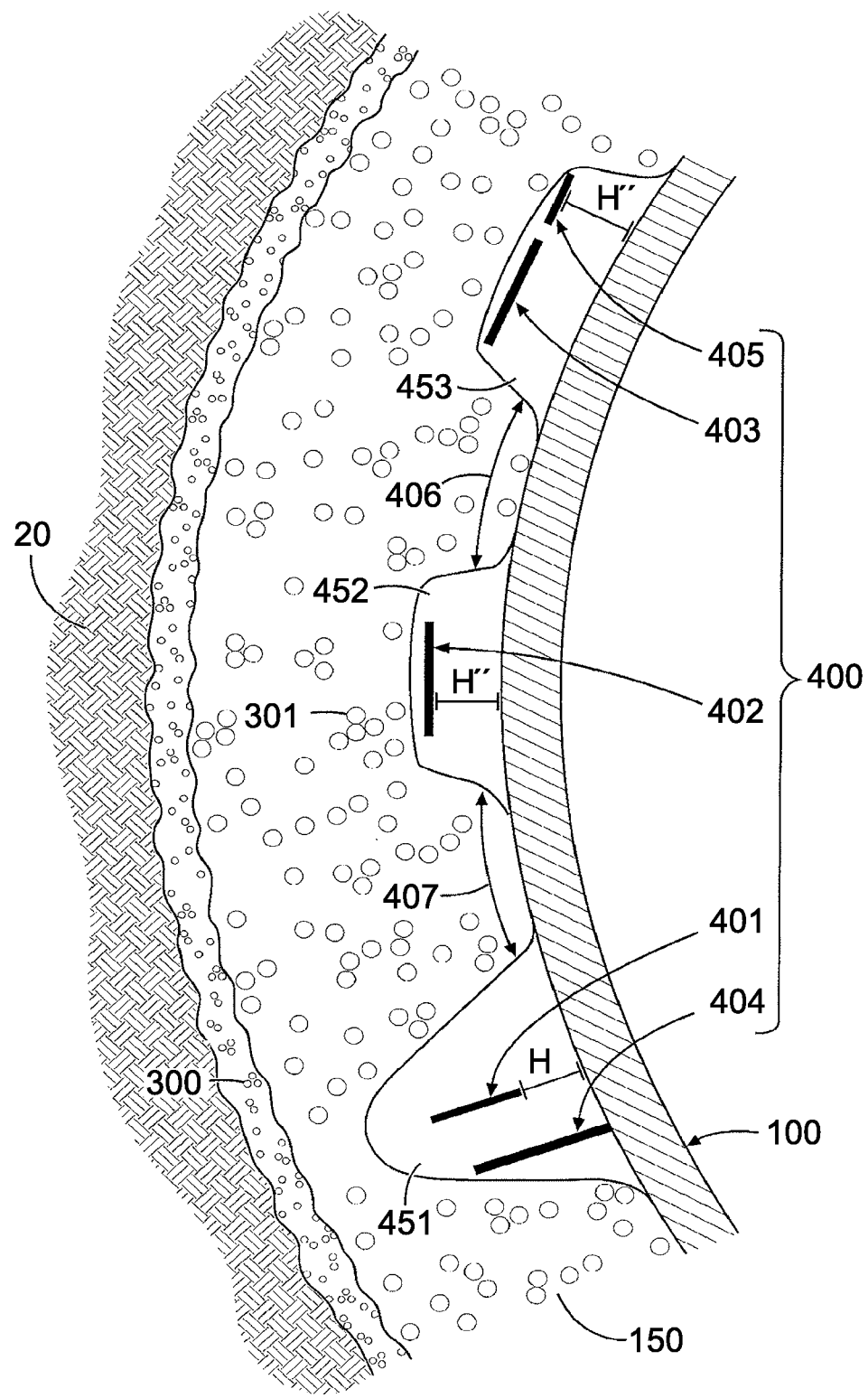
FIG. 2 is a diagram illustrating a partial cross-sectional view of a portion of a well bore where an example of a fluid characterization system according to certain embodiments of the present disclosure is installed.

FIGS. 1 and 2 illustrate certain aspects of certain embodiments of systems and methods of the present disclosure that may be used in cementing operations in a subterranean well bore. Referring now to FIG. 1, a side view of a portion of a well bore 10 is shown penetrating at least a portion of formation 20 according to certain embodiments of the present disclosure. While well bore 10 is shown extending generally vertically into the subterranean formation 20, the principles described herein are also applicable to well bores that extend at an angle through the subterranean formation 20, such as horizontal and slanted well bores. In these embodiments, well bore 10 comprises a partially cased hole in which one or more casing strings 100 are disposed in the well bore 10 creating an annulus 150 between the outer surface of the casing 100 and the wall of the well bore 10. Additional work strings, liners, tubing, fluids, and/or other equipment (not shown) may be disposed in the interior of casing 100 and/or in the annulus 150. Also, as a person of ordinary skill in the art with the benefit of this disclosure will recognize, well bore 10 could comprise one or more liners instead of casing strings, or could be an open hole or partially open hole without such casing strings in other embodiments of the present disclosure. In such embodiments, one or more work strings and/or other tubing strings may be disposed in the well bore 10 even without casings.

A cementing fluid 301 is also disposed in the annulus 150 in FIG. 1, for example, as a part of a primary cementing operation to secure casing 100 in the well bore 10 and seal off the annulus 150. Such cementing fluids may comprise a base fluid (e.g., water) and a slurry of any known settable cementitious material (e.g., Portland cement, slag cement, etc.). However, in other embodiments, any fluid (liquid or gaseous) known or used in subterranean treatment operations could be disposed in annulus 150. In certain embodiments, cementing fluid 301 may have been pumped into the well bore 10 from the surface, through the interior of casing 100 and then circulated into annulus 150 through the bottom (not shown) of the casing 100. A second fluid 300 is also disposed in the annulus 150 uphole of fluid 301. Fluid 300 may comprise, for example, some portion of a drilling fluid, a spacer fluid, another cementing composition, or any other treatment fluid known in the art. In other embodiments, fluid 300 also or instead may comprise a naturally-occurring fluid produced from formation 20, such as water or a hydrocarbon fluid. In certain embodiments, fluid 300 may have been present in the well bore 10 when the cementing fluid 301 was pumped into the well bore 10, and cementing fluid 301 may have displaced fluid 300 into the region of the annulus 150 shown. In some cases, quantifying the degree of displacement of fluid 300 by cementing fluid 301 may be a key metric in monitoring the progress of a primary cementing operation or other operations at the well site.

An example of a fluid characterization system 50 of the present disclosure is shown wherein a portion of the system 50 is disposed on the outer surface of casing 100 in well bore 10. System 50 comprises at least a multi-electrode configuration 400, control electronics 500, and electrical connections or wires 501 therebetween. At least multi-electrode configuration 400 must be disposed in the well bore 10, where fluids are circulated and/or where cement slurry is pumped as described herein. However, control electronics 500 may be disposed at the surface above the well bore 10 while still connected to the electrodes in the multi-electrode configuration 400 via wires and/or a communications link between the electrodes in the well bore and control electronics at the surface. As a person of ordinary skill in the art will recognize with the benefit of this disclosure, multi-electrode configuration 400 and various other components of system 50 instead may be installed on one or more work strings, tubing strings, coiled tubing, wireline, slickline, and/or other equipment disposed in a well bore. In some embodiments, system 50 may be installed to permanently reside in well bore 10 at least for the life of the well. In other embodiments, system 50 may be installed in a manner that it may be retrieved from well bore 10, for example, by tripping the wireline and/or tubing strings on which it is installed out of the well bore 10. Depending on the depth of investigation and the radial resolution of EM measurements obtained using the multi-electrode configuration 400, multiple layers of fluid can be characterized. Further, the position of the borehole wall relative to the multi-electrode configuration 400 and/or formation characteristics can be monitored using the multi-electrode configuration 400. Moreover, control electronics 500 may be integrated into various pieces of equipment located at the surface and/or downhole, including but not limited to the casing and/or a portion of the multi-electrode configuration itself.

To obtain EM measurements, the control electronics 500 direct the multi-electrode configuration 400 to generate and/or measure EM signals that extend into the annulus 150 and possibly some depth into the surrounding formations 20. The control electronics 500 may direct power, telemetry, and/or measurement storage needed to collect EM measurements using one or more multi-electrode configurations as described herein. Further, the control electronics 500 may store, process, and/or display collected EM measurements, fluid characterizations, multi-layer fluid parameters, logs, and/or related information as described herein. Fluid characterization using multi-electrode configurations is possible because variations in the measured EM signals relative to the emitted EM signals are due to the EM properties (e.g., dielectric constant, magnetic permeability, and conductivity) of downhole fluids in the annulus 150 that interact with the emitted EM signals. Accordingly, the measured EM signals can be used to characterize the different types and relative layer thicknesses of fluids present in the annulus 150. Further, the distance between the position of the multi-electrode configuration 400 (and thus the casing 100) and the wall of the borehole 10 can be determined. Further, the attributes of formations 20 within range of the EM signals can be characterized or identified. In certain embodiments, control electronics 500 may comprise a power source, a processor such as a programmable logic controller (PLC) or a suitably programmed computer processor, etc., and a memory in which software and/or other executable instructions may be stored for operating multi-electrode configuration 400 and/or other components of the system. Any suitable processing application software package may be used by the control system.

In certain embodiments, system 50 may further comprise one or more transmitters and/or transceivers (not shown) that are capable of emitting electrical and/or electromagnetic signals in the well bore 10, and control electronics 500 may be programmed to turn such signals on or off and/or to vary the frequencies of the signals. In certain embodiments, control electronics 500 may be further configured to measure the current used by the sensor 400, the voltage applied through a known load impedance to multi-electrode configuration 400, or the power consumed by multi-electrode configuration 400 and/or store data as a function of time relating to those signals. In certain embodiments, control electronics 500 may be further configured to transmit such data to another device (not shown) such as a data interrogator located in well bore 10 or at the surface. Such data transmission may occur via one or more wired connections (not shown) or wirelessly.

The multi-electrode configuration 400 includes a plurality (i.e., at least two) of metallic strip electrodes, wherein the electrodes are formed on or fixably attached to a dielectric material between the electrodes and the tubular base structure (e.g., the casing string), or mounted above the tubular base structure using one or more dielectric spacers, for electrical isolation from surrounding conductive metallic objects. The dielectric material may correspond to less than 0.125" of a material with a dielectric constant between 2.0 to 12.0 and with a very low loss tangent (tan δ). The dielectric material may also be selected based on radio frequency (RF) performance and mechanical properties. A dielectric material such as resins or room temperature vulcanizing (RTV) compounds can also be positioned between electrodes and/or to cover electrodes (as a cover). The dielectric material used between and/or covering electrodes may be selected to have a dielectric constant (εr) value from 2.0 to 5.0, and a loss tangent (tan δ) value of around 0.05. Further, the dielectric material between and/or covering electrodes may be selected based on resistance to corrosion and abrasion as well as its performance within a predetermined temperature range and pressure range. The electrodes and/or dielectric material may be fixably attached to the tubular base structure with the use of adhesive, caulk, a strap, or any other attachment mechanism. In other embodiments, the electrodes may be formed by etching the electrode's shape in metal trace bonded to an insulating dielectric substrate, such as a printed circuit board, with a continuous metal layer bonded to the opposite side of the tubular base structure. The dielectric material provides an insulating layer between a ground plane (e.g., the outer wall of the casing or other tubular base structure) and the electrodes. The multi-electrode configuration 400 also may include an electrically-isolating protective spacer affixed to the electrodes (e.g., using an adhesive, caulk, a strap, etc.), among other reasons, to prevent damage to and/or contamination of the electrodes, and/or to maintain inter-electrode spacing. In other embodiments, the metallic strip electrodes may be embedded or inserted in a dielectric material such as a resin, which may serve one or more of the same functions as the dielectric material and protective spacer.

A cross-sectional view of the formation 20 and well bore 10 along line A in FIG. 1 is shown in FIG. 2, which shows a relatively thin layer of fluid 300 between the inner wall of well bore 10 and cementing fluid 301. Where fluid 301 comprises a cementing fluid, this fluid layer 300 may, among other problems, compromise the bond of the cement with the wall of the well bore 10. The methods and systems of the present disclosure, including fluid characterization system 50, may be used to detect and/or characterize fluid layer 300 or other fluid layers or pockets in annulus 150 by detecting changes in electric and/or electromagnetic fields affected by the fluid layer or pocket.

FIG. 2 also shows further detail of certain embodiments of the multi-electrode configuration 400. As shown, in certain embodiments, multi-electrode configuration 400 comprises a plurality of electrodes 401, 402, 403, 404, and 405 disposed on or encased in resin deposits 451, 452, and 453. Such resins may include any resin known in the art, including resins used in 3-D printing (e.g., ULTEM™ 1010 resin available from Stratasys Ltd.). The resin material in deposits 451, 452, and 453 may comprise any resinous material known in the art, and alternatively may be substituted with any dielectric (e.g., insulating, non-conductive, or low-conductivity) material known in the art, such as rubber, plastic, or other polymeric materials. The electrodes each may comprise a strip of a conductive metal or metal alloy (e.g., aluminum, copper, gold, etc.) that is electrically connected to the control electronics 500 via electrical connections or wires 501 shown in FIG. 1. In certain embodiments, the conductive metal or metal alloy may not be encased in resinous materials but instead may be disposed on the outer surface of the base structure and directly exposed to the well bore. In certain of those embodiments, the conductive metal or metal alloy may be coated with some other material (e.g., nickel), among other reasons, in order to protect the conductive metal from erosion, rust, or other damage that may be caused by exposure to downhole fluids and/or conditions.

As shown in FIG. 2, electrodes 401, 402, 403, and 404 may comprise electrodes in the form of elongated strips that run along the length of the casing 100 parallel to its central axis. In other embodiments, the multi-electrode configuration 400 may comprise one or more electrodes in the form of rings or circular arcs coaxial with the circular cross section of the casing. Such electrodes may be offset from the surface of the casing (by similar heights (e.g., radial distances from the outer surface of the casing) as described above), and can be as short as 1 inch in length. In other embodiments, such electrodes may encircle the entire length of a casing string, e.g., in parallel rings or long spiral shapes. Other shapes of electrodes are possible, including but not limited to discs, fringing "comb" shapes, plates, squares, rectangles, circles, ellipses, and the like.

In at least some embodiments, the electrodes in the multi-electrode configuration 400 may be connected to a power supply, either a downhole supply such as a battery (e.g., in control electronics 500) or located at the surface. Further, in at least some embodiments, the electrodes in the multi-electrode configuration 400 may be in communication with a control unit that provides power and/or telemetry for the multi-electrode configuration. In certain embodiments, the multi-electrode configuration 400 receives power from the control unit and generates an EM field that penetrates the nearby annulus 150 containing fluids of interest. In certain embodiments, another EM source (not shown) in the vicinity of the well bore 10 may generate an EM field (instead of or in addition to an EM field generated by the multi-electrode configuration 400) that penetrates the annulus 150 containing the fluids of interest. The EM field(s) may also penetrate a distance into the surrounding formation 20, depending on the strength and frequency associated with the EM field. Further, the multi-electrode configuration 400 measures corresponding EM fields that have been attenuated or other altered due to interaction with the fluid in the annulus 150 and/or with the formation 20. In certain embodiments, this may be due to one or more electromagnetic properties of the fluids, including but not limited to the electrical conductivity and/or the dielectric constant of the fluid. Thus, these measurements may indicate the nature of the fluid(s) present in the annulus.

In certain embodiments, electrodes 401, 402, 403, and 404 may vary in length and/or thickness, and may vary in position and/or orientation relative to the other components of the system 50 and the well bore. For example, electrodes 401 and 404 are shown disposed along a radial plane (not shown) with their surfaces at approximately 90 degree angles from the surface of casing 100, while electrodes 402, 403, and 405 are shown disposed along a different plane (not shown) that is not parallel to the plane of electrodes 401 and 404. As a person of skill in the art with the benefit of this disclosure will recognize, the electrodes may be oriented along planes at other angles (e.g., 45 degrees, 30 degrees, etc.) relative to the surface of the casing and/or each other. In certain embodiments, the width of radially-oriented electrodes may range from about 0.25 inches to about 1 inch. One edge of electrode 404 may be disposed immediately adjacent to or in contact with casing 100 (and thus may act as a ground for electrode 401), while the corresponding edge of electrode 401 closest to casing 100 may be offset from the surface of the casing by a height H. Electrodes 402, 403, and 405 may comprise microstrip electrodes disposed horizontally with their surfaces parallel to the surface of casing 100. Such electrodes may be as short as about 1 inch in length, but may vary in length and, in some embodiments, may extend substantially the entire length of the base structure (e.g., the casing or pipe string) on which they are disposed. Such electrodes may vary in thickness as well, but in some embodiments may be as much as 0.5 inches thick. As shown, electrode 402 may be offset from the surface of casing 100 by a height H', while electrodes 403 and 405 may be offset from the surface of casing 100 by a height H". Moreover, the resin deposits carrying the various electrodes are separated by gaps 406 and 407, which may, among other things, allow for better fluid flow through the well bore. In certain embodiments, heights H, H', and H" may range from about 0.25 inches to about 2 inches.

The variations in heights H, H', and H" and of the length, position, and/or orientation of various electrodes in the fluid sensor may, among other things, allow for greater sensitivity to electrical signals and/or electromagnetic fields in the well bore 10. For example, radially-oriented electrodes may be able to detect different electromagnetic fields than the horizontally-oriented electrodes, and thus having electrodes in both orientations in a single sensor unit or system may improve the overall sensitivity of the system. Heights H, H', and H" also may be minimized and/or optimized to maximize fluid flow through the annulus 150. In certain embodiments, the electrodes configured according to the present disclosure may be able to measure electrical current and signals at frequencies ranging from about 100 KHz to about 1 GHz. However, the configuration(s) and number of electrodes shown in FIG. 2 are merely an example of one way that electrode sensors may be configured according to methods and systems of the present disclosure, and many other suitable configurations exist consistent with that disclosure.

In certain embodiments, the electrodes used in the present disclosure may comprise microstrip antennas or patches. Such microstrip antennas or patches may have lengths ranging from about 4 inches to about 20 inches, which may vary based on, among other factors, the operating frequency of the system in which they are used. For microstrip or patch antennas, the frequency of operation may range from about 100 MHz to about 1 GHz. At 100 MHz, the microstrip antennas or patches may have lengths of around 20 inches if possible, while at 1 GHz, the microstrip antennas or patches may have lengths of around 4 inches if possible. In certain embodiments, if multiple frequencies are used, the microstrip antennas or patches may have lengths of between about 8 and about 16 inches (e.g., about 12 inches).

The data from the electrodes in multi-electrode configuration 400 may be transmitted to the control electronics 500 and/or to another data receiver 505 at the surface above well bore 10. In certain embodiments, the data receiver 505 and/or control electronics 500 may be communicatively coupled to an information handling system 510 that is capable of analyzing the data from fluid characterization system 50. The term "communicatively coupled" as used herein is intended to mean coupling of components in a way to permit communication of information therebetween. Two components may be communicatively coupled through a wired or wireless communication network, including but not limited to Ethernet, LAN, fiber optics, radio, microwaves, satellite, and the like. Operation and use of such communication networks is well known to those of ordinary skill in the art and will, therefore, not be discussed in detail herein. As a person of ordinary skill in the art will recognize with the benefit of this disclosure, data receiver 505 and/or information handling system 510 may be disposed at the surface above the well bore 10 while still connected to the control electronics 500 via wires and/or a communications link therebetween. Moreover, data receiver 505 and/or information handling system 510 may be integrated into various pieces of equipment located at the surface and/or downhole, including but not limited to the casing and/or a portion of the multi-electrode configuration itself.

An information handling system in accordance with the present disclosure may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer or tablet device, a cellular telephone, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. In one embodiment, the software produces data that may be presented to the operation personnel in a variety of visual display presentations such as a display. Suitable control systems and interfaces for use in information handling systems according to the methods and systems of the present disclosure may comprise SENTRY™ and INSITE™ systems provided by Halliburton Energy Services, Inc. Any suitable control system or interface may be used in keeping with the principles of this disclosure.

In certain embodiments, the data receiver or information handling system at the surface at the well site may be communicatively coupled to an external communications interface. The external communications interface may permit the data from the data receiver or information handling system to be remotely accessible (i.e., from a location other than the well site) by any remote information handling system communicatively coupled to the external communications interface via, for example, a satellite, a modem or wireless connections. In one embodiment, the external communications interface may include a router.

Figure 3:
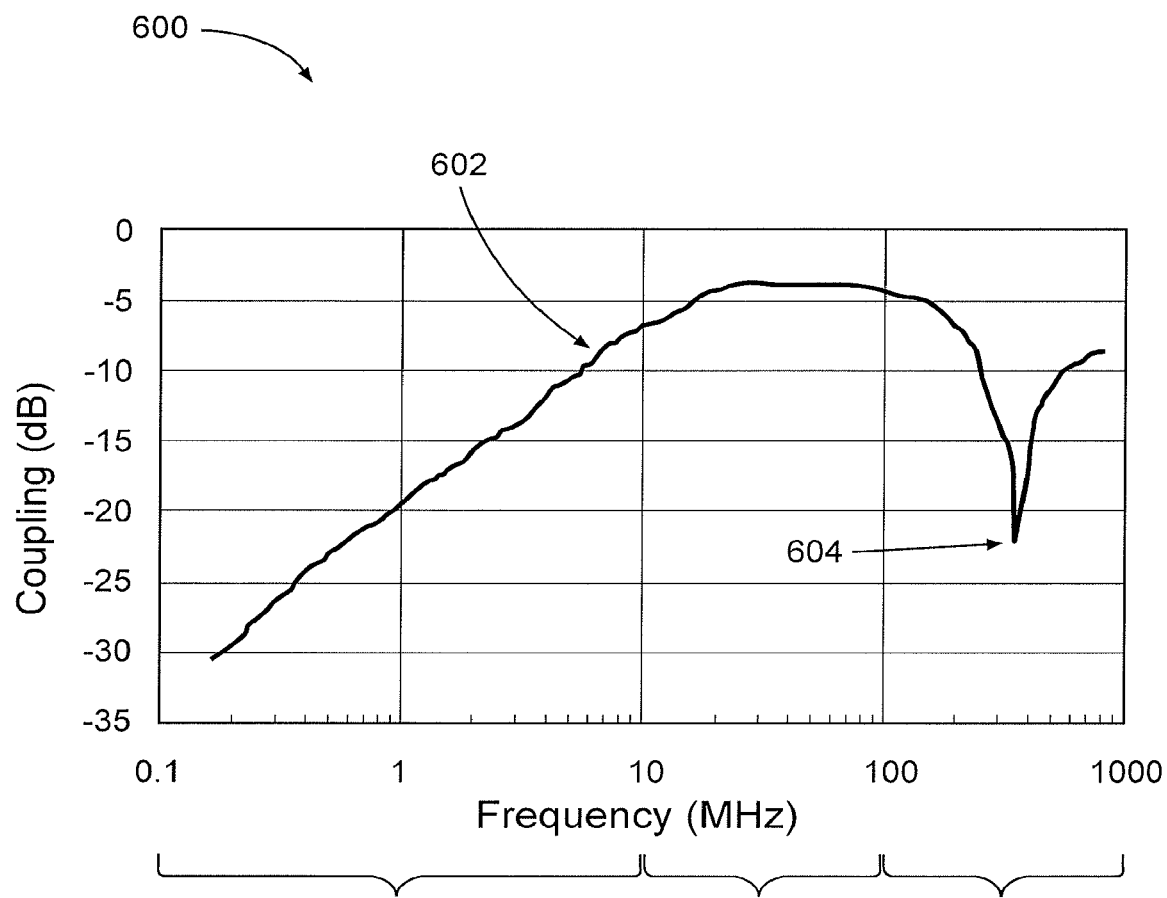
FIG. 3 is a graph of an illustrative coupling coefficient curve as a function of frequency according to certain embodiments of the present disclosure.

In certain embodiments of the present disclosure, the information handling system may be configured to perform one or more different types of analysis on the data collected by the electrode sensors. In at least some embodiments, multi-electrode configurations as described herein can be used to obtain coupling measurements between two or more electrodes, where the coupling measurements can be used to characterize fluids in the annulus. In FIG. 3, graph 600 shows an illustrative coupling coefficient curve 602 as a function of frequency. The coupling coefficient curve 602 corresponds to a particular sample fluid or fluids (e.g., depending on the depth of investigation and resolution intended for one or more multi-electrode configurations). More specifically, the coupling coefficient curve 602 may be associated with one or more fluids based on the maximum coupling coefficient value (around 4 dB), the sharpness of a primary resonance null 604, the depth of the primary resonance null 604, the center frequency of the primary resonance null 604, and/or other parameters. As a general rule, fluids with higher resistivity have sharper and deeper primary resonance nulls 604. Also, fluids with higher dielectric constants have higher coupling coefficient maximums. When plotting coupling coefficient data as a function of logarithmic frequency values, the lower frequency region becomes nearly a straight line and a coupling model may be used to fit the measured data using three parameters: C, n' (real component), and n" (imaginary component). These fit values then form one type of "signature" for any fluid combination:

$$\text{coupling(dB)} = 10 \log 10 \left( \frac{jC \tan \theta}{\sqrt{1 - C^2} + j \tan \theta} \right)$$

wherein $$\theta = \frac{2\pi f}{c} nd \text{ and } n = n' - jn''$$

Using the fit parameters, homogeneous fluids are readily differentiated. Test results indicate that the values of n' and n" will vary for different fluids or fluid mixtures. With layered fluids (such as thicker drilling mud adhering to the casing exterior surface with less viscous spacer fluid filling the remainder of the annulus), most parameters match the fluid nearest the electrodes but are nonetheless different. In the case of borehole servicing fluids, the fluids have effective dielectric constant values that vary with frequency over the range 10 MHz to 1000 MHz and also have varying loss tangent values. The variations in those values can be used to differentiate fluid mixtures. In at least some embodiments, a set of template coupling coefficient curves previously derived or measured for known fluids or mixtures of fluids are compared to a coupling coefficient curve obtained from the measurements of one or more multi-electrode configurations deployed downhole. The template coupling coefficient curve that best matches the measured coupling coefficient curve can be selected and used to characterize a fluid or fluids in the annulus near the multi-electrode configuration(s) corresponding to the obtained measurements. One or ordinary skill in the art would appreciate that besides comparing coupling coefficient curves, other analysis techniques may be employed to characterize fluids in an annulus using measurements from one or more multi-electrode configurations deployed along a casing exterior as described herein. For example, alternative analysis methods would include use of multi-layer artificial neural networks (ANN), forward modeling combined with the use of least squares analysis of fit quality, and geophysical inversion methods.

Further, in different embodiments, data processing variations may be helpful to conserve memory and/or to focus measurement analysis to particular areas of interest. For example, in order to conserve data memory, the coupling coefficient may be measured only at spaced intervals along a linear frequency axis or a log frequency axis as shown in FIG. 3. Further, the sampling interval may vary for different frequency regions (e.g., the sampling interval for certain regions in the well bore may be smaller than the sampling interval for other regions to provide higher resolution for resonance null analysis). Also, the operator may vary the frequency sweep intervals when collecting measurements. Further, in at least some embodiments, fluids to be pumped downhole may be altered or "spiked" by adding small quantities of other materials to the fluids to enhance variations in their dielectric constants, magnetic permeabilities, and/or conductivities. Such alterations may be useful when two base fluids are found to be relatively similar such that measurements obtained from multi-electrode configurations are unable to distinguish between the two base fluids.

In certain embodiments, the volume of fluid corresponding to measurement obtained from multi-electrode configurations may be directly related to the spacing between the electrodes. Electrodes that are close together will provide information regarding fluid that is close to the casing, while electrodes that are spaced far apart will provide information regarding fluid that is further from the casing (possible even near the borehole wall and/or the surrounding formation). With multiple sets of electrodes with different spacings, one can analyze what fluids are near the casing, within the annulus, near the borehole wall, and/or in the formation. Further, the position of the borehole wall relative to the casing can be determined. As desired, fluid characterization operations using multi-electrode configurations as described herein can be used before, during, and/or after cementing operations to improve the efficiency and/or quality of cementing operations. As drilling operations are dependent on cement curing time, detecting cementing curing using the measurements from multi-electrode configurations as described herein can also reduce the overall time needed to drill a borehole.

Figure 4:
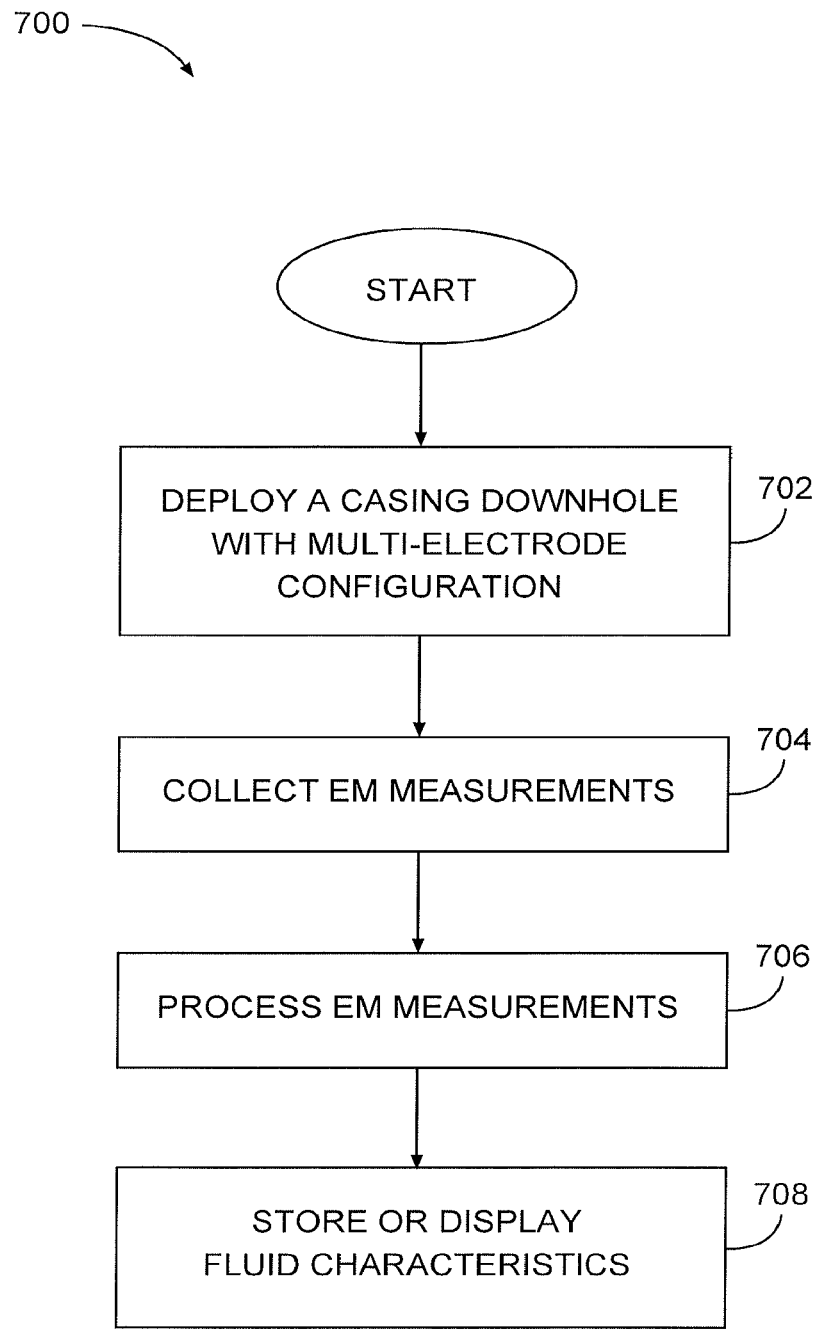
FIG. 4 is a flowchart illustrating methods of characterizing downhole fluids according to certain embodiments of the present disclosure.

FIG. 4 shows a flowchart showing an illustrative downhole fluid characterization method 700. In certain embodiments, one or more steps of method 700 may be performed by an information handling system, as described above. As shown, the method 700 includes deploying a casing with a multi-electrode configuration of the present disclosure in a downhole environment 702. In the downhole environment, the multi-electrode configuration will be in close proximity with the fluids present in the annulus and/or in the surrounding formation. Accordingly, the multi-electrode configuration can be used to detect characteristics of nearby fluids as described herein. At block 704, EM measurements are collected using the multi-electrode configuration, where the collected EM measurements are a function of the conductivity, magnetic permeability, dielectric constant, and/or other properties of nearby fluids. At block 706, the collected EM measurements are processed. For example, the processing operations of block 706 may include performing a coupling coefficient analysis and/or curve comparison as described herein. At block 708, fluid characteristics identified based on the processing operations of block 706 are stored or displayed. For example, the identified fluid characteristics may be represented in text form, graph form, log form (e.g., one or more fluid layers and respective thicknesses as a function of measured depth, azimuth, time, etc), and/or as an image of the borehole environment near the multi-electrode configuration. In at least some embodiments, a multi-layer model is used, and the properties of each layer (e.g., thickness, fluid type(s), dielectric constant, magnetic permeability, conductivity, etc.) are represented to an operator. Using the stored or displayed fluid characterization information, the operator may make decisions such as initiating or stopping pumping operations for one or more fluids related to drilling or cementing operations, altering fluids being pumped (e.g., providing an additive to enhance EM properties of different fluids being pumped), initiating or stopping drilling operations, etc.

The present disclosure in some embodiments provides methods for using and/or characterizing various treatment fluids to carry out a variety of subterranean treatments, including but not limited to, cementing operations, pre-flush treatments, after-flush treatments, stimulation treatments (e.g., hydraulic fracturing treatments, acidizing treatments, etc.), sand control treatments (e.g., gravel packing), "frac-pack" treatments, well bore clean-out treatments, workover treatments, drilling operations, completion operations, consolidation treatments, and other operations where a treatment fluid may be useful. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

An embodiment of the present disclosure is a method comprising: placing a tubular base structure having a multi-electrode configuration disposed thereon in at least a portion of a well bore penetrating at least a portion of a subterranean formation, the multi-electrode configuration comprising at least first and second electrodes with a dielectric layer between the tubular base structure and the electrodes, wherein the first electrode is positioned at a first height from an outer surface of the tubular base structure and at least another of the electrodes is positioned at a second height from an outer surface of the tubular base structure that is greater than or less than the first height; collecting electromagnetic measurements using the multi-electrode configuration; and processing the electromagnetic measurements to obtain a characterization of at least one fluid in an annulus between the tubular base structure and an inner wall of the well bore.

Another embodiment of the present disclosure is a method comprising: placing a tubular base structure having a multi-electrode configuration disposed thereon in at least a portion of a well bore penetrating at least a portion of a subterranean formation, the multi-electrode configuration comprising at least: a first electrode oriented along at least a first plane, a second electrode oriented along at least a second plane, and a dielectric layer between the tubular base structure and the electrodes, wherein the first and second planes are not parallel to each other; collecting electromagnetic measurements using the multi-electrode configuration; and processing the electromagnetic measurements to obtain a characterization of at least one fluid in an annulus between the tubular base structure and an inner wall of the well bore.

Another embodiment of the present disclosure is a fluid characterization system comprising: a tubular base structure having a multi-electrode configuration disposed thereon in at least a portion of a well bore penetrating at least a portion of a subterranean formation, the multi-electrode configuration comprising at least: a first electrode oriented along at least a first plane, a second electrode oriented along at least a second plane, and a dielectric layer between the tubular base structure and the electrodes, wherein the first and second planes are not parallel to each other; an electronic control unit electrically coupled to the first and second electrodes; and a processor electrically coupled to the electronic control unit and the electrodes.

Another embodiment of the present disclosure is a fluid characterization system comprising: a tubular base structure having a multi-electrode configuration disposed thereon in at least a portion of a well bore penetrating at least a portion of a subterranean formation, the multi-electrode configuration comprising at least first and second electrodes with a dielectric layer between the tubular base structure and the electrodes, wherein the first electrode is positioned at a first height from an outer surface of the tubular base structure and at least another of the electrodes is positioned at a second height from an outer surface of the tubular base structure that is greater than or less than the first height; an electronic control unit electrically coupled to the first and second electrodes; and a processor electrically coupled to the electronic control unit and the electrodes.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    placing a tubular base structure having a multi-electrode configuration disposed thereon in at least a portion of a well bore penetrating at least a portion of a subterranean formation, wherein a first fluid is present in an annulus between the tubular base structure and an inner wall of the wellbore, and wherein the multi-electrode configuration comprising at least:
        a first electrode oriented along at least a first plane,
        a second electrode oriented along at least a second plane, and
        a dielectric layer between the tubular base structure and the electrodes, wherein the first and second planes are not parallel to each other;
    circulating a cementing fluid into the annulus to displace at least a first portion of the first fluid from the annulus while a second portion of the first fluid remains in the annulus;
    allowing the cementing fluid to at least partially set in the annulus;
    collecting electromagnetic measurements using the multi-electrode configuration; and
    processing the electromagnetic measurements to obtain a characterization of at least one fluid in the annulus between the tubular base structure and an inner wall of the well bore, wherein the characterization of the least one fluid comprises a characterization of a second portion of the first fluid.

2. The method of claim 1 wherein the first electrode is positioned at a first height from an outer surface of the tubular base structure and at least another of the electrodes is positioned at a second height from an outer surface of the tubular base structure that is greater than or less than the first height.

3. The method of claim 2 wherein one of the first or second heights ranges from 0.25 inches to 2 inches.

4. The method of claim 1 wherein the tubular base structure is a pipe string, a casing string, or a mandrel.

5. The method of claim 1 wherein:
    the tubular base structure comprises a casing string.

6. The method of claim 1 wherein the first fluid is a drilling fluid, a spacer fluid, or a combination thereof.

7. A fluid characterization system comprising:
    a tubular base structure having a multi-electrode configuration disposed thereon in at least a portion of a well bore penetrating at least a portion of a subterranean formation, the multi-electrode configuration comprising at least:
        a first electrode oriented along at least a first plane,
        a second electrode oriented along at least a second plane, and
        a dielectric layer between the tubular base structure and the electrodes, wherein the first and second planes are not parallel to each other;
    an electronic control unit electrically coupled to the first and second electrodes; and
    a processor electrically coupled to the electronic control unit and the electrodes, wherein the processor executes one or more instructions stored in a non-transitory memory to:
        collect one or more electromagnetic measurements;
        process the one or more electromagnetic measurements to obtain a characterization of at least one fluid in an annulus between the tubular base structure and an inner wall of the well bore, wherein the characterization is based on at least a partially set cementing fluid circulated into the annulus to displace at least a first portion of a first fluid in the annulus while a second portion of the first fluid remains in the annulus, wherein the characterization comprises a characterization of the second portion of the first fluid.

8. The system of claim 7 wherein the tubular base structure is a pipe string, a casing string, or a mandrel.

9. The system of claim 7 wherein the first electrode is positioned at a first height from an outer surface of the tubular base structure and at least another of the electrodes is positioned at a second height from an outer surface of the tubular base structure that is greater than or less than the first height.

* * * * *